United States Patent [19]

Clement et al.

[11] Patent Number: 5,478,002
[45] Date of Patent: Dec. 26, 1995

[54] MAGNETIC TEE-NUT HOLDER

[75] Inventors: Ole Clement, Sunds, Denmark; Ivan J. Leko, Toronto, Canada

[73] Assignees: Sigma Tool & Machine, Partnership of Sigma Tool & Machine Ltd.; Sigma Fasteners Ltd., Scarborough, Canada

[21] Appl. No.: 262,328

[22] Filed: Jun. 17, 1994

[51] Int. Cl.[6] .................................................. B23P 19/00
[52] U.S. Cl. ................................ 227/113; 29/798; 29/282
[58] Field of Search ............................ 227/113, 16, 114; 29/798, 809, 282, 432

[56] References Cited

U.S. PATENT DOCUMENTS

| | | | |
|---|---|---|---|
| 3,765,588 | 10/1973 | Frederickson | 227/113 |
| 5,007,795 | 4/1991 | Yoshimura | 414/737 |
| 5,214,843 | 6/1993 | Bromley et al. | 29/798 |
| 5,323,531 | 6/1994 | Leistner et al. | 227/16 |

FOREIGN PATENT DOCUMENTS 3405117  8/1984  Germany ................. 227/113

*Primary Examiner*—Richard K. Seidel
*Assistant Examiner*—Allan M. Schrock

[57] ABSTRACT

A magnetic Tee-nut holder for use in a Tee-nut setting machine having a feed guide channel for feeding and guiding Tee-nuts towards the end of the channel in registration with a rod for driving the endmost Tee-nut into a workpiece. The magnetic Tee-nut holder is positioned at the end of the channel for magnetically holding the endmost Tee-nut in a position in registration with the driving rod. Also disclosed is a method of magnetically holding a Tee-nut at the end of a feed guide channel of a Tee-nut setting machine, for driving by a driving rod.

5 Claims, 5 Drawing Sheets

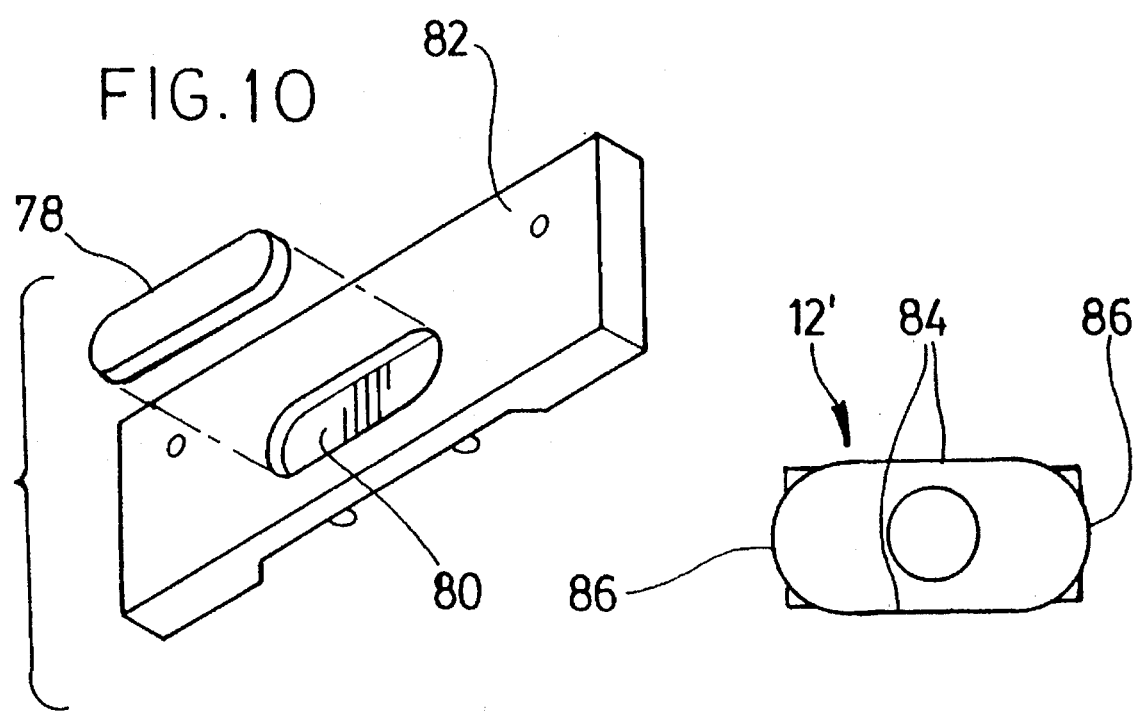

MAGNETIC TEE-NUT HOLDER

FIELD OF THE INVENTION

The present invention relates to a magnetic Tee-nut holder and in particular to a magnetic Tee-nut holder for use in Tee-nut setting machines. The present invention also relates to a method of holding a Tee-nut at the end of a feed guide channel of a Tee-nut setting machine.

BACKGROUND OF THE INVENTION

Tee-nuts are widely used in the furniture industry for securing components of furniture together. Various types of power-operated Tee-nut setting machines have been devised for the setting of Tee-nuts into a workpiece at a high rate of speed.

In one type of Tee-nut setting machine, Tee-nuts are fed from a hopper down a feed guide channel to a power-operated driving assembly for driving Tee-nuts into a workpiece. The endmost Tee-nut is releasably held in registration with the driving assembly by releasable finger means, or the like, biased by spring means.

However, this kind of finger means is not reliable and may sometimes fail to hold the Tee-nut in a desired position due to malfunction of the spring means.

Another type of Tee-nut setting machine is disclosed in U.S. Pat. No. 4,821,940 granted to Allan C. Rotherham on Apr. 18, 1989.

In order to control the feeding and positioning of Tee-nut in registration with a driver assembly, Rotherham's machine makes use of a step member between the endmost Tee-nut and the next Tee-nut in line. The endmost Tee-nut must be moved over the step member to a position where it is held in registration with the driving assembly. The remaining Tee-nuts in the feed guide channel are held back by the step member so that they do not interfere with the driving of the endmost Tee-nut.

In order to make the above arrangement work, a piston is employed to raise the endmost Tee-nut over the step member so that it can register with the driving assembly. The use of a piston to raise the endmost Tee-nut over a step member to a position in registration with a driving assembly is also not reliable as the piston may fail to work.

Furthermore, this mechanism is not suitable for Tee-nuts fed from a roll or drum wherein Tee-nuts are linked together by connecting means.

BRIEF SUMMARY OF THE INVENTION

An object of the present invention is to provide a magnetic Tee-nut holding assembly for use in a Tee-nut setting machine having a feed guide channel adapted to feed and guide Tee-nuts towards the end of the feed guide channel in registration with a rod for driving the Tee-nut into a workpiece, the magnetic Tee-nut holding assembly comprising magnetic means disposed at the end of the feed guide channel for magnetically capturing and holding an endmost Tee-nut in a position in registration with the driving rod.

Preferably, the magnetic means comprises a pair of magnets embedded in a non-magnetic end plate facing the end of the feed guide channel. An iron plate is provided at the back of the end plate facing away from the end of the feed guide channel and is magnetically coupled with the pair of magnets to form a magnetic loop.

The magnets are fitted within blind end recesses provided in the end plate. The blind end recesses define end walls for holding the magnets in place.

Preferably, a recess portion is provided on a surface of the non-magnetic end plate, facing the end of the feed guide channel, for receiving an edge portion of a Tee-nut.

A pair of anti-friction strips may optionally be provided on a surface of the end plate facing the end of the feed guide channel for reducing the friction and wear between the Tee-nut and the non-magnetic end plate.

Another object of the present invention is to provide a method of magnetically holding a Tee-nut at the end of a feed guide channel of a Tee-nut setting machine whereby the Tee-nut is in registration with a rod for driving the Tee-nut into a workpiece.

The method comprises the steps of supplying Tee-nuts from a Tee-nut supplying means, feeding and guiding the Tee-nuts along a channel towards an open end thereof, and magnetically capturing and holding an endmost Tee-nut at the open end of the channel in a position in registration with a rod for driving the endmost Tee-nut into a workpiece.

The various features of novelty which characterize the invention are pointed out with more particularity in the claims annexed to and forming a part of this disclosures. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 10 is a perspective view of another embodiment of the present invention; and, FIG. 11 is a top plan view of another type of Tee-nut having straight sides and rounded ends.

DESCRIPTION OF A SPECIFIC EMBODIMENT

Figure 1:
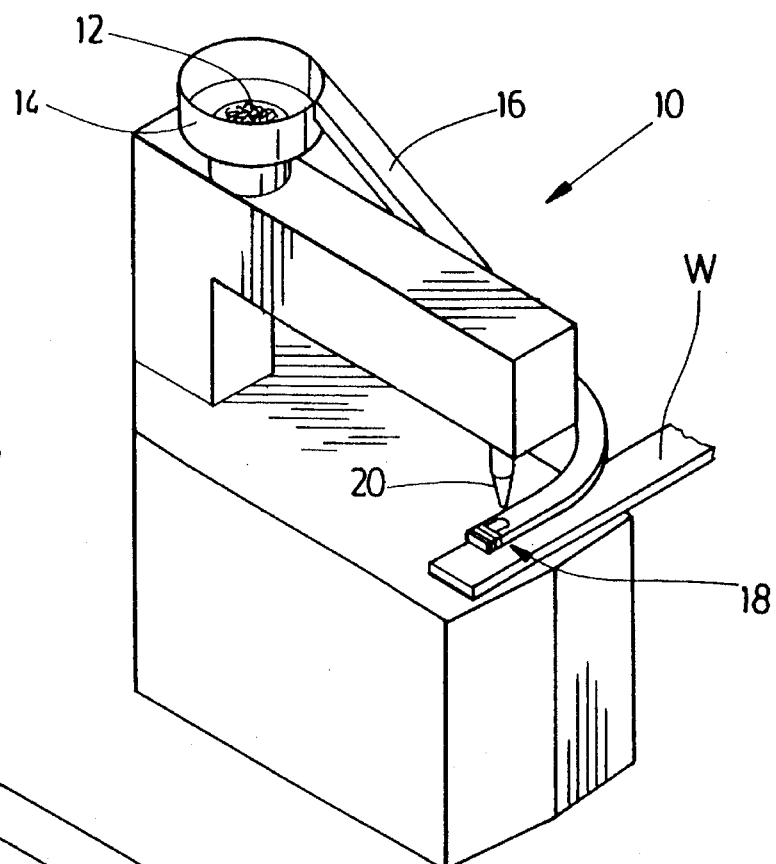
FIG. 1 shows a magnetic Tee-nut holder being incorporated into a Tee-nut setting machine in which the supply of Tee-nuts is from a hopper.

Referring now in more detail to the drawings, in which like reference numerals represent like parts throughout the several views, FIG. 1 shows a Tee-nut setting machine designated generally by reference numeral 10 shown here for the purposes of illustrating an embodiment of the invention. In this type of machine, Tee-nuts 12 are stored loose in a hopper 14, and are fed along a feed guide channel 16 to a setting mechanism. A magnetic Tee-nut holding assembly 18 is provided at the end of the feed guide channel 16. The magnetic Tee-nut holding assembly 18 is adapted to magnetically capture and hold a Tee-nut at the open end of the feed guide channel 16 in a position in registration with a driving rod 20 in the setting mechanism for driving the Tee-nut into a workpiece W.

Figure 2:
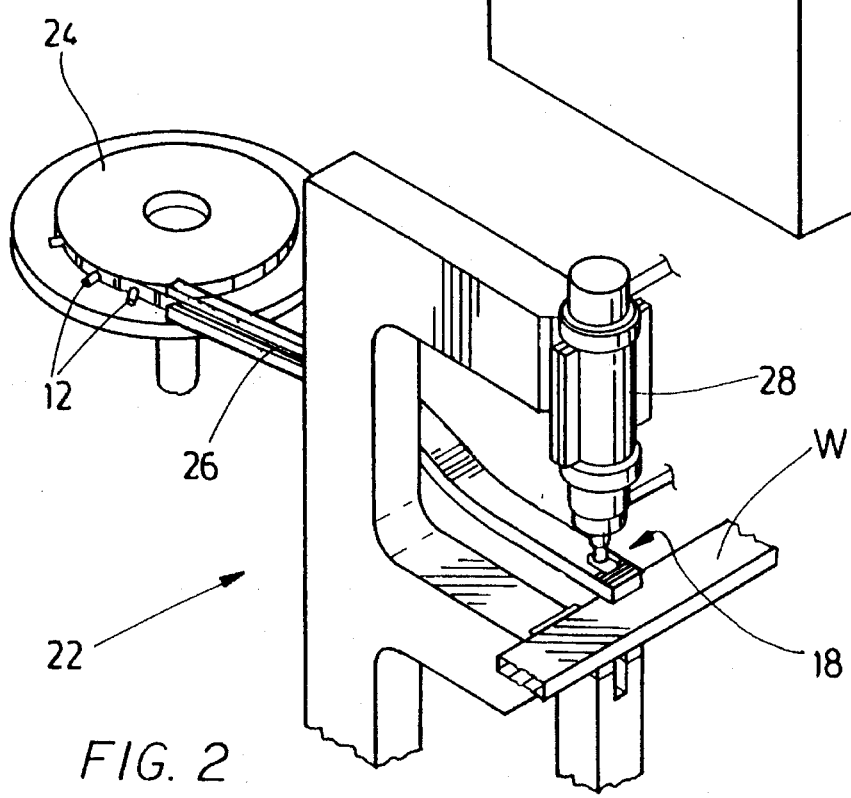
FIG. 2 shows a magnetic Tee-nut holder being incorporated into a Tee-nut setting machine in which the supply of Tee-nuts is from a roll.

FIG. 2 shows another embodiment of magnetic Tee-nut holding assembly 18 illustrating the present invention, in another type of Tee-nut setting machine 22 wherein Tee-nuts 12 are supplied from a roll 24 and are fed along a twisting feed guide channel 26.

The magnetic Tee-nut holding assembly 18 is provided at the end of the feed guide channel 26 and is adapted to magnetically capture and hold a Tee-nut at the open end of the feed guide channel 26 in such a position that the Tee-nut is in registration with a rod 28 for driving the Tee-nut into a workpiece W.

Details of the magnetic Tee-nut holding assembly 18 will be described later.

Figure 3:
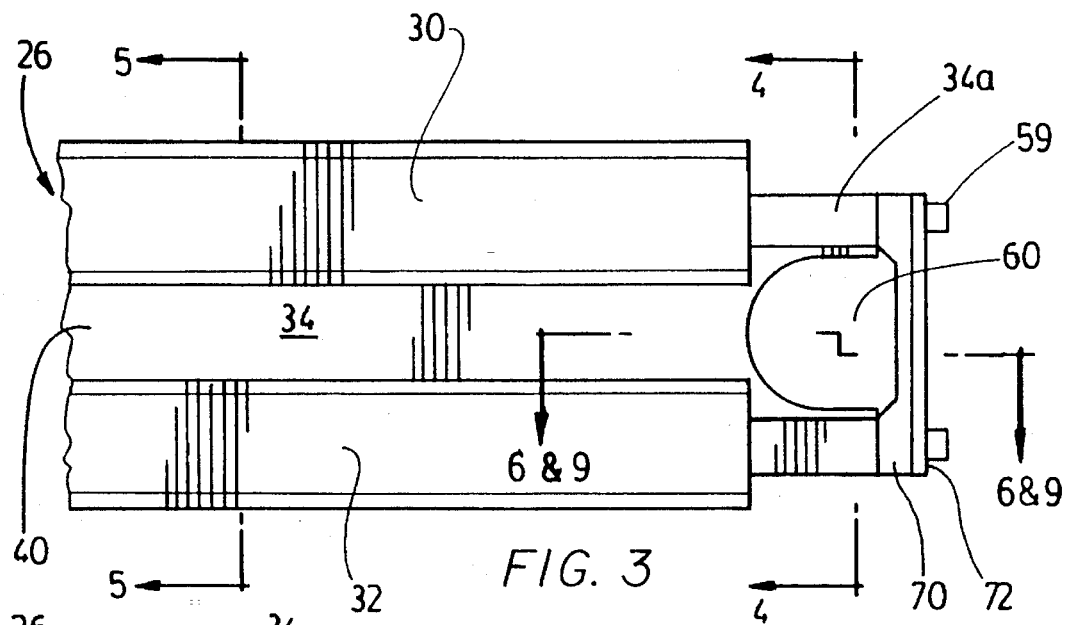
FIG. 3 is a bottom plan view of a magnetic Tee-nut holder mounted to the end portion of a feed guide channel.
Figure 4:
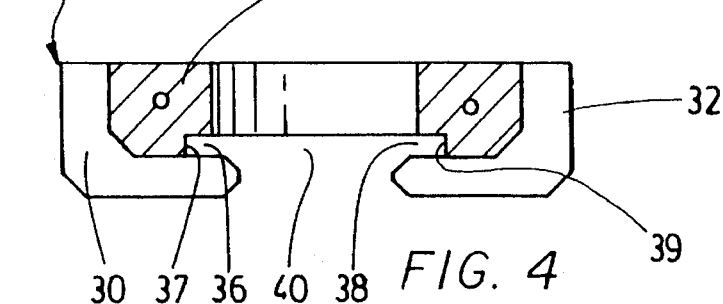
FIG. 4 is a cross section view taken along line 4—4 of FIG. 3.
Figure 5:
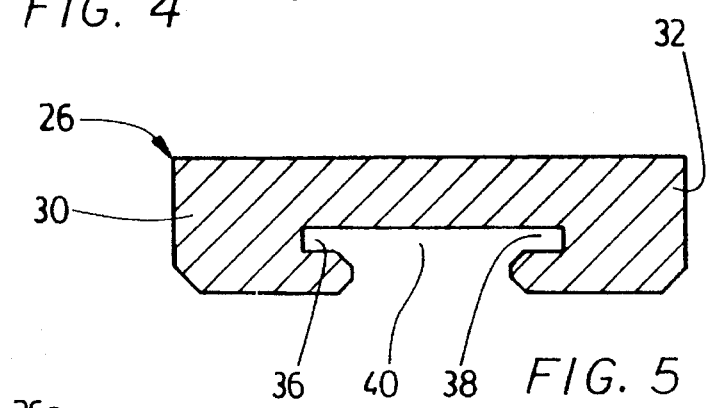
FIG. 5 is a cross section view taken along line 5—5 of FIG. 3.

FIG. 3 is a bottom plan view of a magnetic Tee-nut holding assembly 18 secured to the end of the feed guide channel 26. The feed guide channel 26 consists of two arm portions 30, 32 and a shoulder portion 34 defining two transverse slots 36, 38 and an opening 40, as best illustrated in FIGS. 4 and 5.

The Tee-nuts 12 are adapted to slide along the feed guide channel 26 towards an open end thereof.

Figure 6:
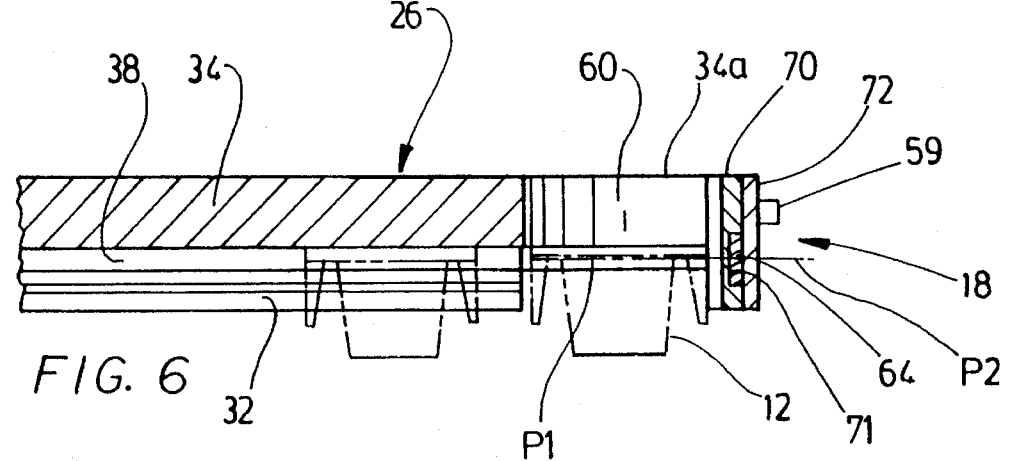
FIG. 6 is a cross section view taken along line 6—6 of FIG. 3.
Figure 8:
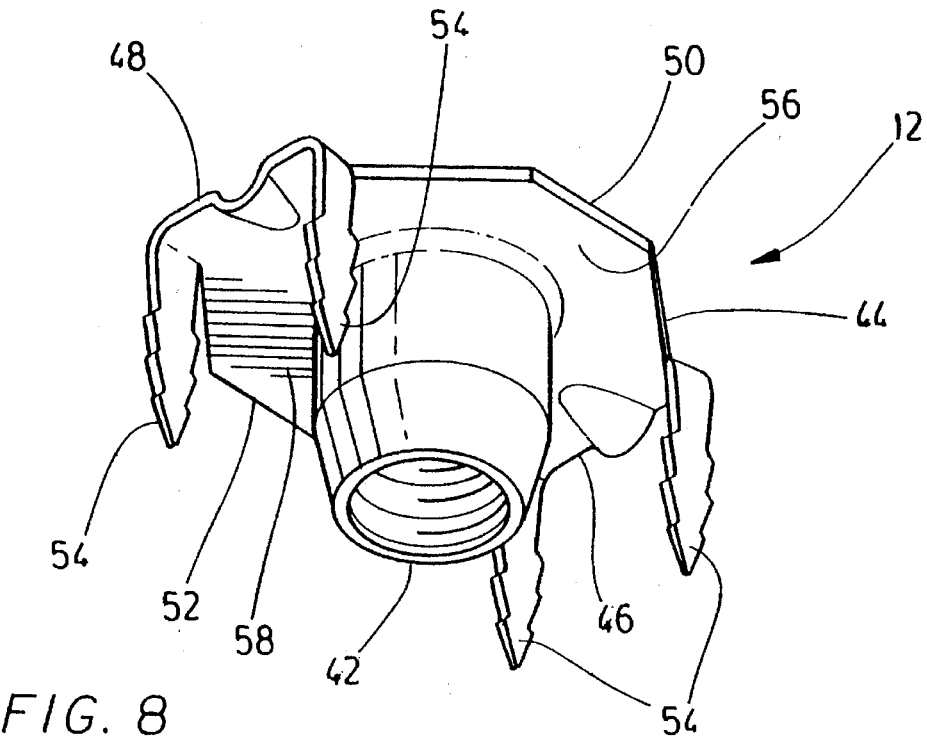
FIG. 8 is a perspective view of a Tee-nut.

The Tee-nut 12 of a conventional type is made of steel and is thus attracted to the magnet. As illustrated in FIG. 8, the Tee-nut 12 has an internally threaded fastening sleeve portion 42 and a horizontal head flange 44 disposed perpendicular thereto. The head flange 44 of the Tee-nut 12 defines a generally transverse flange plane P1, as shown in FIG. 6. The head flange 44 in this case takes the form of a generally octagon-shaped flat sheet having a certain thickness, although other shapes are possible, such as square or rectangular, or may have straight sides and rounded ends.

In this example, it has an eight-sided periphery with a leading or front edge 46, a rear edge 48, and two side edges 50, 52. Four prongs 54 are formed from the material on diagonally opposite sides which join the side edges 50, 52 to either the front edge 46 or the rear edge 48.

Support means 56, 58 are formed from the material in the head flange 44 adjacent the side edges 50, 52 respectively. The support means 56, 58 of the Tee-nut 12 are adapted to be supported in the transverse slots 36, 38 of the feed guide channel 26 respectively. The prongs 54 and the fastening sleeve portion 42 extend out of the opening 40.

The shoulder portion 34 at the end of the feed guide channel 26 extends further outwards from the ends of the two arm portions 30, 32. This extended shoulder portion, represented by reference numeral 34a, extends a length slightly longer than the length of the Tee-nut 12 measuring from the front edge 46 to the rear edge 48.

A magnetic Tee-nut holding assembly 18 is secured to the end of the extended shoulder portion 34a, for example, by screw means 59 or welding or the like (not shown).

A cutout portion 60 is provided generally at the centre of the extended shoulder portion 34a between the longitudinal edges thereof allowing the driving rod 20 or 28 to pass through.

FIG. 4 is a cross section view taken along line 4—4 of FIG. 3 showing a cross section of the extended shoulder portion 34a. It can be seen that stepped side edge portions 37, 39 are formed at the lower inner sides of the extended shoulder portion 34a for guiding the movement of Tee-nuts.

FIG. 6 is a cross section view taken along line 6—6 of FIG. 3 showing a cross section of the magnetic Tee-nut holding assembly 18 mounted at the end of the extended shoulder portion 34a extending from the feed guide channel 26. The Tee-nuts 12 are shown in phantom. The Tee-nuts 12, supported by the arm portions 30, 32, slide along slots 36 and 38 and move towards the end of the feed guide channel 26. It is noted that the extended shoulder portion 34a does not have arm portions or slots to support the Tee-nuts 12. When a Tee-nut 12 reaches the end of the feed guide channel 26, it comes within the influence of the magnetic field of the magnetic Tee-nut holding assembly 18. It is drawn underneath the extended shoulder portion 34a along the stepped side edges 37, 39 thereof and is captured by the magnetic Tee-nut holding assembly 18 at the end of the extended shoulder portion 34a.

The magnetic Tee-nut holding assembly 18 captures the Tee-nut 12 by the leading flange edge 46 in such a way that the head flange 44 remains in a horizontal position and the sleeve 42 faces downwards.

Figure 7:
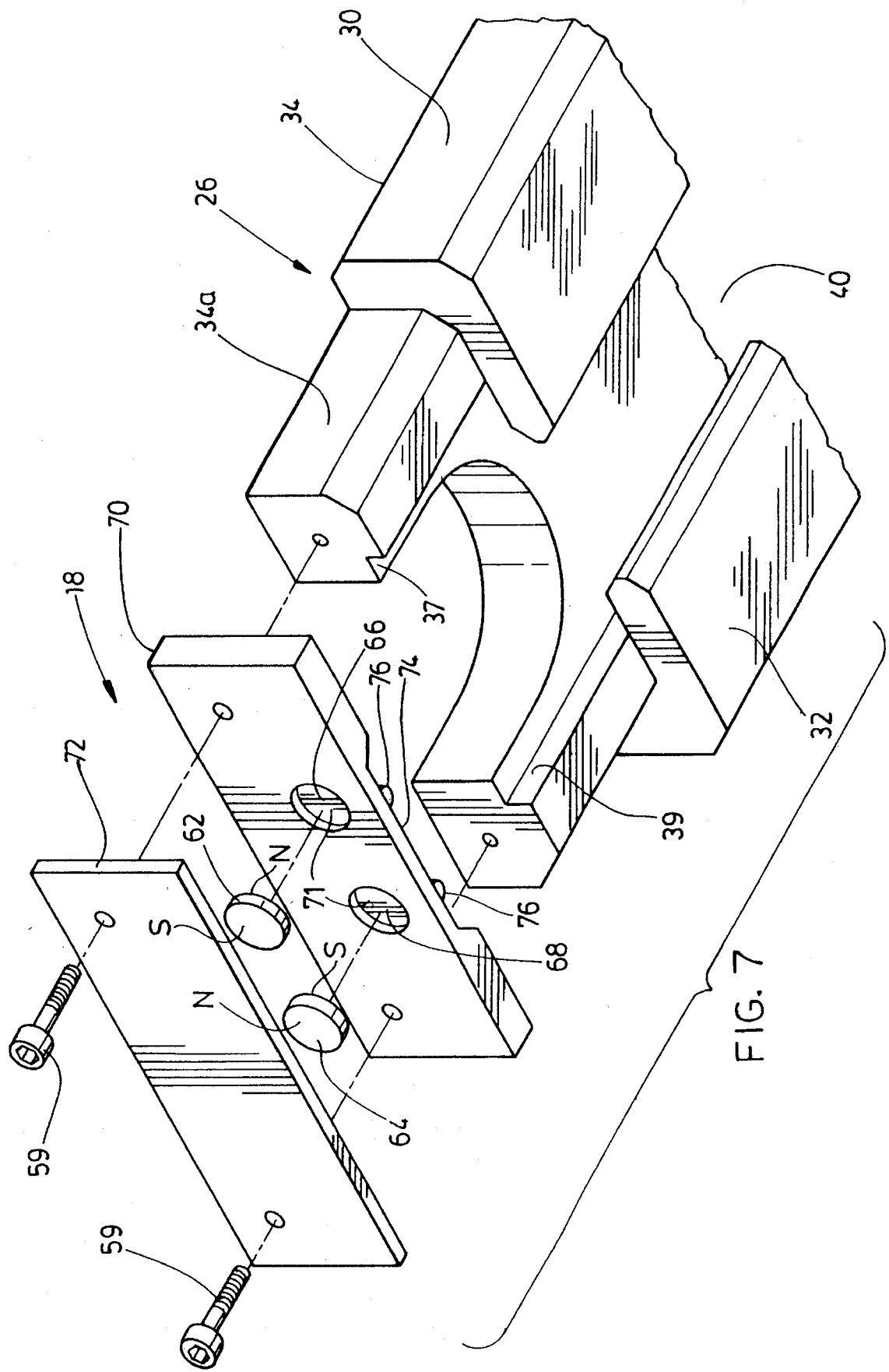
FIG. 7 is an exploded perspective view of a magnetic Tee-nut holder illustrating an embodiment of the present invention.

As shown in FIG. 7, the magnetic Tee-nut holding assembly 18 in this illustrated embodiment comprises a pair of magnets 62, 64. According to the preferred embodiment, the pair of magnets 62, 64 are of disc shaped. The pair of magnets 62, 64 are respectively fitted within blind end magnet recesses 66, 68 provided in an end plate 70 such that the magnets 62, 64 are horizontally spaced apart from each other. The recesses 66, 68 do not penetrate through the end plate 70, but define end walls 71, 71 (FIGS. 6 and 9) for holding the magnets 62, 64 in place.

The end plate 70 is secured to and disposed at the end of the feed guide channel 26 perpendicular to the axis of movement of the Tee-nuts 12. The blind end magnet recesses 66, 68 are lying in a transverse plane P2 (FIG. 6) adapted to register with the transverse flange plane P1 defined by the head flange 44 of the Tee-nut 12.

The end plate 70 is made preferably of non-magnetic material such as stainless steel although even magentic materials will work. The two magnets 62, 64 have respective north N and south S poles oriented such that the north pole N of one magnet generally faces the leading edge of a Tee-nut and the south pole S of the other magnet generally faces the same leading edge of the Tee-nut.

However, the end walls 71 are not essential, provided the magents are held in place securely, and the Tee-nut is not subject to a twisting movement.

A ferrous member such as an iron plate 72 is mounted to the end plate 70 which is in turn mounted to the end of the extended shoulder portion 34a by screw means 59, 59. The screw means 59, 59 may also make of non-magnetic material such as stainless steel but magnetic material is also effective. The iron plate 72 is magnetically coupled with the pair of magnets 62, 64 forming together a magnetic loop means, having a north pole N at one side and a south pole S at the other side facing the Tee-nut, for magnetically capturing and holding an endmost Tee-nut 12.

A recess 74 is provided on the surface of the end plate 70 facing the end of the feed guide channel 26. According to the preferred embodiment, the recess 74 extends vertically along the entire length of the end plate 70 in a direction of the movement of the driving rod for driving the Tee-nut into a workpiece. The plan section of the recess 74 generally conforms in shape with the leading edge portion of the head flange 44 of the Tee-nut 12.

When the endmost Tee-nut is attracted by the pair of magnets 66, 68, the magnetic force captures and holds the Tee-nut 12 magnetically in such a way that the leading edge 46 of the Tee-nut 12 abuts against the surface of the recess 74, whereby the Tee-nut is held firmly by the magnets 62, 64. In this position, the Tee-nut registers with a driving rod. When the driving rod is operated it knocks the Tee-nut off the magnetic Tee-nut holding assembly 18 and drives it into a workpiece W.

Figure 9:
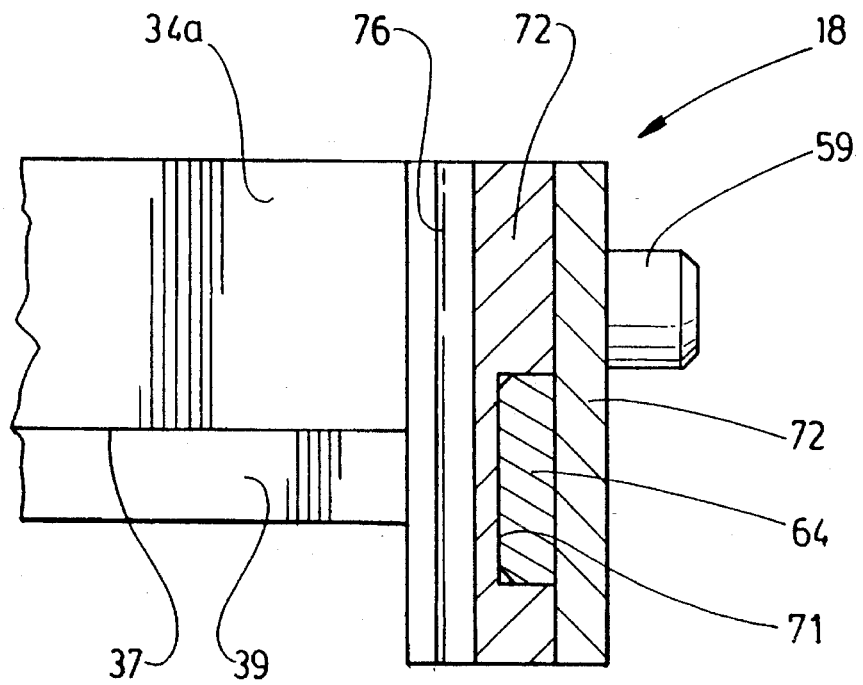
FIG. 9 is an enlarged cross section view similar to FIG. 6 showing the magnetic Tee-nut holder and an anti-friction strip provided thereon.

As shown in FIGS. 7 and 9, a pair of anti-friction strips 76, 76 may optionally be integrally provided on the surface of the recess 74 for reducing the wear and friction between the Tee-nut 12 and the end plate 70. These anti-friction strips 76, 76 extend vertically along the entire length of the end plate 70 in a direction of the movement of the driving rod.

The present invention further includes a method of magnetically holding a Tee-nut at the end of a feed guide channel of a Tee-nut setting machine, whereby the endmost Tee-nut is in registration with a driving rod for driving the Tee-nut into a workpiece.

The method comprises the steps of supplying Tee-nuts from a Tee-nut supplying means, feeding and guiding the Tee-nuts along a channel towards an open end thereof, and magnetically holding an endmost Tee-nut at the open end of the feed guide channel in a position in registration with a driving rod for driving the endmost Tee-nut into a workpiece.

Referring to FIGS. 1 and 2 again, Tee-nuts 12 are supplied from a hopper 14 or a roll 24 of Tee-nuts 12. The Tee-nuts 12 are fed into a feed guide channel 16 or 26. The Tee-nuts 12 slide along the feed guide channel towards an open end thereof. The endmost Tee-nut is magnetically held by a magnetic Tee-nut holding assembly 18 at the open end of the feed guide channel in such a position that it is in registration with a rod for driving the endmost Tee-nut into a workpiece.

While the invention is illustrated in the form of two permanent magnets, it will be appreciated that it is not confined to this example. A single magnet, or an electromagnet and coil, or two such electromagnets may be equally suitable. The term "magnetic means" as used herein are deemed to include all such forms of magnets and devices that may serve to provide a magnetic attraction for such Tee-nuts.

FIG. 10 shows another embodiment of a magnet of the magnetic Tee-nut holding assembly 18 of the present invention. A single magnet 78 is fitted within a recess 80 provided on a non-magnetic end plate 82. In this embodiment, the magnet 78 is of elongated shape and has a dimension as wide as a Tee-nut 12.

Although it has been shown that the magnet 78 is in an elongated shape, it is appreciated that the magnet 78 can be in any other shapes and dimensions so long as it can efficiently capture and firmly hold a Tee-nut in a desired position.

FIG. 11 is a top plan view of another type of Tee-nut 12' which can be captured and held by the magnetic Tee-nut holding assembly 18 of the present invention. This Tee-nut 12' has straight sides 84 and rounded ends 86. The straight sides 84 are adapted to be received in and slide along the slots 36, 38 of the feed guide channel 26 respectively. The rounded ends 86 are adapted to abut against the end plates provided at the end of the feed guide channel 26. It is understood that other types of Tee-nuts can also be captured and held by the magnetic Tee-nut holding assembly 18 of the present invention.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A magnetic Tee-nut holding assembly for use in a Tee-nut setting machine having a feed guide channel adapted to feed and guide Tee-nuts which have a generally horizontal head flange defining a generally transverse flange plane, towards the end of said feed guide channel in registration with a rod for driving one of said Tee-nuts into a workpiece, said magnetic Tee-nut holding assembly comprising;

a non-magnetic end plate member provided at the end of said feed guide channel perpendicular to the axis of movement of said Tee-nuts, said end plate member having an inner surface facing said feed guide channel and an outer surface facing away from said feed guide channel;

opening means provided at the end of said feed guide channel adjacent said inner surface of said end plate member and extending substantially across the entire width of said feed guide channel for permitting said driving rod to pass therethrough;

a first blind end magnet recess means provided on said outer surface of said end plate member;

a first magnet in said first blind end magnet recess means;

a second blind end magnet recess means provided on said outer surface of said end plate member;

a second magnet in said second blind end magnet recess means;

said first and second blind end magnet recess means lying in a transverse plane, adapted to register with said transverse flange plane, and disposed in a horizontally spaced apart relationship; and, a ferrous plate member provided on said outer surface of said end plate member and magnetically coupled with said first and second magnets;

whereby said first and second magnets are adapted to ma. gnetically hold a Tee-nut by a head flange leading edge portion thereof in a position in registration with said opening means wherein said head flange of said Tee-nut remains horizontal.

2. A magnetic Tee-nut holding assembly as claimed in claim 1 wherein said first and second magnets and said ferrous plate member together define a magnetic loop means having a north pole at one side and a south pole at the other side facing said Tee-nut for magnetically holding said Tee-nut.

3. A magnetic Tee-nut holding assembly as claimed in claim 1 including a recess portion provided on said inner surface of said end plate member for receiving an edge portion of a Tee-nut.

4. A magnetic Tee-nut holding assembly as claimed in claim 3 including anti-friction strip means provided on a surface of said recess portion for reducing the friction between said Tee-nut and said end plate member.

5. A magnetic Tee-nut holding assembly as claimed in claim 1 including end wall means in said first and second blind end recess means for holding said magnets in said blind end recess means.

\* \* \* \* \*